United States Patent
Mankovskii et al.

(10) Patent No.: US 9,967,219 B2
(45) Date of Patent: May 8, 2018

(54) PRIVACY PRESERVING METHOD AND SYSTEM FOR LIMITING COMMUNICATIONS TO TARGETED RECIPIENTS USING BEHAVIOR-BASED CATEGORIZING OF RECIPIENTS

(71) Applicant: CA, INC., New York, NY (US)

(72) Inventors: Serguei Mankovskii, San Ramon, CA (US); Maria Velez-Rojas, San Jose, CA (US)

(73) Assignee: CA, INC., New York, NY (US)

( * ) Notice: Subject to any disclaimer, the term of this patent is extended or adjusted under 35 U.S.C. 154(b) by 445 days.

(21) Appl. No.: 14/665,422

(22) Filed: Mar. 23, 2015

(65) Prior Publication Data
US 2016/0285804 A1 Sep. 29, 2016

(51) Int. Cl.
G06F 15/16 (2006.01)
H04L 12/58 (2006.01)
H04L 29/08 (2006.01)

(52) U.S. Cl.
CPC .............. H04L 51/12 (2013.01); H04L 67/22 (2013.01)

(58) Field of Classification Search
CPC ...... H04L 51/12; H04L 41/0893; H04L 67/22
USPC ........................................................ 709/206
See application file for complete search history.

(56) References Cited

U.S. PATENT DOCUMENTS

| | | | |
|---|---|---|---|
| 9,147,082 B2 * | 9/2015 | Whitmyer, Jr. ..... | G06F 21/6218 |
| 2003/0110400 A1 * | 6/2003 | Cartmell ................. | H04L 51/12 726/4 |
| 2004/0215977 A1 * | 10/2004 | Goodman ............ | G06Q 10/107 726/22 |
| 2005/0204001 A1 * | 9/2005 | Stein .................... | G06Q 10/107 709/206 |
| 2009/0150497 A1 * | 6/2009 | McAfee ............... | G06Q 10/107 709/206 |
| 2009/0282036 A1 * | 11/2009 | Fedtke ................ | G06F 21/6254 |
| 2009/0282094 A1 * | 11/2009 | Hawkins ................. | H04L 51/12 709/203 |
| 2010/0268682 A1 * | 10/2010 | Lewis .................. | G06Q 10/107 706/54 |
| 2010/0318613 A1 * | 12/2010 | Souza .................. | G06Q 10/107 709/206 |
| 2011/0087743 A1 * | 4/2011 | Deluca ................. | G06Q 10/107 709/206 |
| 2011/0246584 A1 * | 10/2011 | Vitaldevara .......... | G06Q 10/107 709/206 |
| 2012/0131107 A1 * | 5/2012 | Yost ........................ | H04L 51/12 709/206 |

(Continued)

*Primary Examiner* — Imad Hussain
(74) *Attorney, Agent, or Firm* — Vierra Magen Marcus LLP (57) ABSTRACT

In a data-handling machine system which has data originating and replicating units (e.g., smartphones) configured to allow users to create or replicate and transmit voluminous amounts of data (e.g., emails) on a recipients-targeting basis to large numbers of recipients, a communications constraining mechanism is provided which intercepts emails (or other forms of recipients-targeting communications), classifies the communications, categorizes the targeted recipients and then based on the classifications and categorizations, generates recommendations on whether to block or let through as is the intercepted communications to their intended recipients.

19 Claims, 5 Drawing Sheets

(56) References Cited

U.S. PATENT DOCUMENTS

| | | | | |
|---|---|---|---|---|
| 2012/0303439 A1* | 11/2012 | Flitcroft | ............... | G06Q 10/107 705/14.36 |
| 2013/0185361 A1* | 7/2013 | Balasubramanian | ... | H04L 51/12 709/206 |
| 2014/0006522 A1* | 1/2014 | Syrowitz | ................. | H04L 51/12 709/206 |
| 2014/0067975 A1* | 3/2014 | Ding | ........................ | H04L 51/12 709/206 |
| 2015/0013012 A1* | 1/2015 | Marman | ................. | H04L 51/12 726/26 |
| 2015/0286819 A1* | 10/2015 | Coden | .................... | G06F 21/552 726/23 |
| 2015/0310098 A1* | 10/2015 | Chudnovskiy | ........ | G06F 21/577 726/25 |
| 2016/0164819 A1* | 6/2016 | Shrivastava | ............ | H04L 51/24 709/206 |
| 2017/0322902 A1* | 11/2017 | Baldry | ................. | G06F 15/173 |

* cited by examiner

Recipient Categorization Methods

PRIVACY PRESERVING METHOD AND SYSTEM FOR LIMITING COMMUNICATIONS TO TARGETED RECIPIENTS USING BEHAVIOR-BASED CATEGORIZING OF RECIPIENTS

FIELD OF DISCLOSURE

The present disclosure relates generally to intra-enterprise communications and more specifically to machine-implemented methods for automatically determining who among potential recipients of enterprise managed communications (e.g., in-house emails) should be protected from receiving communications (e.g., in-house emails) that are likely to be annoying, time-wasting and resource wasting for them or for the enterprise.

DESCRIPTION OF RELATED TECHNOLOGY

Electronic mail (also known as "email") is both boon and bust for enterprise managed communications. On one hand, it allows an enterprise leader (e.g., CEO) to quickly but privately communicate with all members of an enterprise when information, vital to all, needs to be shared. On the other hand, it empowers certain individuals to broadcast to too many people (e.g., by way of automated CC, BCC or email Forwarding lists) information that the recipients probably do not want to receive and do not need to receive and which communication may be detrimental to the efficiency of enterprise operations. For example, not everyone in a large business enterprise will want to receive an email from Margie's BFF (Best Friend Forever) informing them about Margie in Procurement and how her cat just had six kittens. The phenomenon is commonly known as "TMI" (Too Much Information).

A problem arising from this is how to mitigate the TMI problem without offending people or burdening them with excessive lists of rules. It may be impolite to confront Margie's best friend (e.g., her BFF) and tell her, "Look no one wants to know about your friend's cat." Also it can be burdensome to generate long lists of do-this and do-not do-that rules with respect to who should get certain emails and who should not and then to have users comply with those rules.

It is to be understood that this background of the technology section is intended to provide useful background for understanding the here disclosed technology and as such, this technology background section may include ideas, concepts or recognitions that were not part of what was known or appreciated by those skilled in the pertinent art prior to corresponding invention dates of subject matter disclosed herein.

SUMMARY

Structures and methods are provided in accordance with the present disclosure for limiting communications to targeted recipients of emails (or of other forms of recipient-targeting communications) using behavior-based categorizing of recipients while preserving privacies and minimizing behavior that might be offensive to some people.

In accordance with one aspect of the present disclosure, a machine-implemented system automatically tracks how recipients of emails (or of other forms of recipient-targeting communications—hereafter also "emails/others") behave with respect to different classifications of targeted content sent to them. Do they eagerly open each up within minutes of its receipt being chimed to them by their smartphone or do they discard it without even looking at it or do nothing and let it pile up in their Inbox? Is the communication automatically redirected to their "spam" folder (and if so, on what basis) or is it automatically redirected to a must-read, high importance folder (and if so, on what basis)? Or is the received communication automatically forwarded to a large CC (carbon copy) and/or BCC (blind carbon copy) list of subsequent tier recipients (e.g., My 100 Friends)? After opening some of such targeted communications, do the recipients spend much time on it, send a reply to it and/or do something more? If something more, does that further activity include automatically and/or routinely forwarding it to a large CC and/or BCC list? Does that further activity include doing something substantive and useful with received information?

A further aspect of tracking that is disclosed here with respect to post-receipt behaviors of recipients involves keeping as anonymized, the information gathered about their post-receipt behaviors. In other words, steps are taken to prevent others from discovering the identifies of the recipients and discovering their post-receipt behavior(s). It might be socially embarrassing or upsetting for the parties involved if an emails/others sender learns that one or more of his/her often-copied recipients routinely redirects received emails/others to a spam folder whenever the "From" field indicates it is from that particular sender.

In accordance with a further aspect of the present disclosure, steps are taken to automatically or semi-automatically reduce the number of recipients and/or amount of content sent to them, not only for a first hierarchical level of transmitting to further recipients but also for chain-reaction-like further hierarchical levels of attempted transmitting of content (e.g., by automated next level CC'ing to a large pool of further recipients) based on one or more classifications assigned to the content and based on need/desire-to-know categorizing attributes assigned to the respectively targeted recipients.

By using such communication trimming methods, unnecessary utilization of enterprise resources (e.g., communication bandwidths, data storage spaces) can be reduced and worker productivity can be increased. More specifically, unnecessary emails (or other forms of recipient-targeting communications; a.k.a. "emails/others") are not sent in the first place to recipients who have no need/desire-to-know and such emails/others are therefore not chain reaction wise propagated throughout the enterprise to yet further persons who likely also do not want to see them but receive them anyway due to unconstrained forwarding policies implemented by some individuals within the organization. Moreover, working time of enterprise personnel is not wasted in reading or otherwise dealing with such chain propagated emails/others that the targeted recipients did not want to receive in the first place. In other words, enterprise workloads are advantageously reduced.

In accordance with yet a further aspect of the present disclosure, steps are taken to automatically or semi-automatically increase the number of recipients in cases where an anonymized tracking database indicates the left-out recipients normally are included but for some reason were inadvertently left off a targeting list for information they do have a need/desire-to-know.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
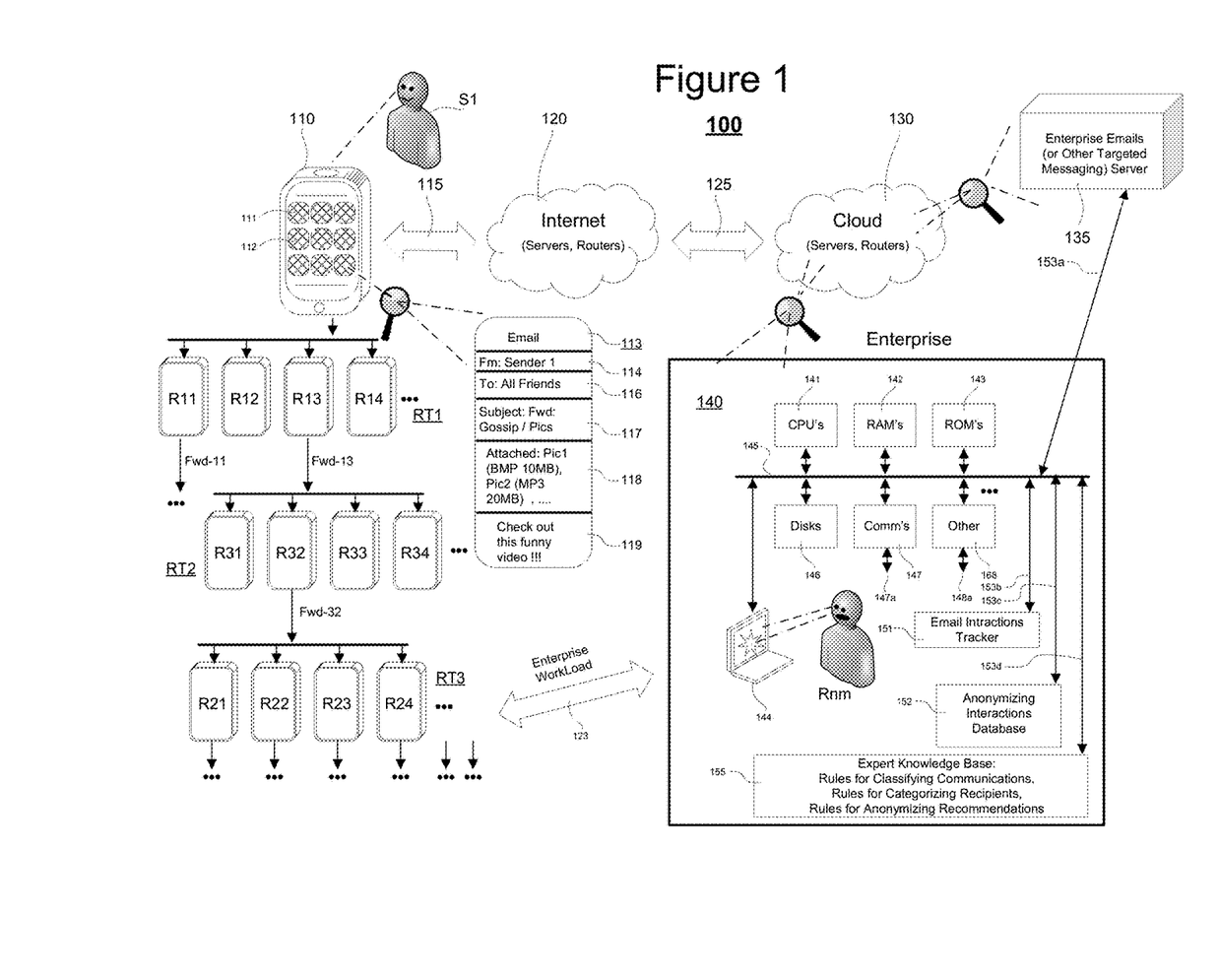
FIG. 1 is a block diagram schematically showing an interconnected multi-device enterprise system which includes a mechanism for constraining chain reaction like propagation of emails (or of other forms of recipients-targeted communications) which can be detrimental to efficiency of enterprise operations.

FIG. 1 is a block diagram showing an integrated client-server/internet/cloud system 100 (or more generically, an integrated multi-device system 100) to which the here disclosed technology may be applied. System 100 may also be referred to as a data-handling machine system in which there are provided a variety of data communications originating and replicating units (e.g., smartphone 110) configured to allow users thereof to create or replicate data (e.g., email 113) for communication on a recipient-targeting basis to one or more targeted recipients (e.g., Rnm) and there is further provided a communications intercepting unit (e.g., 135) configured to automatically intercept all or a specified percentage of recipients-targeting communications launched within the data-handling machine system 100, where the interceptions occur before the launched communications are received in recipient accessible storage areas (e.g., email InBoxes—not shown) of recipients targeted by the recipients-targeting communications.

It is to be understood that the illustrated system 100 is merely exemplary. As indicated, it comprises one or more client devices 110 (only one shown in the form of a wireless smartphone but understood to represent many clients—including those in hierarchical recipient tiers RT1-RT3—and not only of the smartphone wireless client kind) capable of originating or copying and forwarding recipients-targeting communications such as emails. The system further comprises: one or more wired and/or wireless communication fabrics 115 (only one shown in the form of a wireless bidirectional interconnect) coupling the client(s) 110 to networked servers 120 (not explicitly shown, and can be part of an Intranet or the Internet) where the latter may operatively couple by way of further wired and/or wireless communication fabrics 125 (not explicitly shown) to further networked servers 130 (not explicitly shown).

The second set of networked servers 130 is depicted as a "cloud" 130 for the purpose of indicating a nebulous and constantly shifting, evolving set of hardware, firmware and software resources. In-the-cloud resources are typically used by large scale enterprise operations for the purpose of keeping mission critical tasks going. As those skilled in the art of cloud computing appreciate, the "cloud" 130 may be implemented as reconfigurable virtual servers and virtual software modules implemented across a relatively seamless web of physical servers, storage units (including flash BIOS units), communication units and the like such that failure of specific units within the physical layer are overcome by shifting the supported virtual resources to spare other support areas in the physical layer. Because of sheer size and also this constantly shifting and self-reconfiguring fabric of resources, it can be very difficult to spot problems where system resource are being unnecessary consumed. Even if large, cloud resources are finite and may undergo performance degradation if not wisely used.

Still referring to FIG. 1, a quick and introductory walk through is provided here so that readers may appreciate the bird's eye lay of the land, so to speak. Item 111 represents a first user-activatable software application (first mobile app) that may be launched from within the exemplary mobile client 110 (e.g., a smartphone, but could instead be a tablet, a laptop, a wearable computing device; i.e. smartwatch or other). Item 112 represents a second such user-activatable software application (second mobile app) and generally there are many more. Each client-based application (e.g., 111, 113) can come in the form of nontransiently recorded digital code (i.e. object code or source code) that is defined and stored in a memory for instructing a target class of data processing units to perform in accordance with client-side defined application programs ('mobile apps' for short) as well as to cooperate with server side applications implemented on the other side of communications links 115 and/or 125.

One example of a first mobile app (e.g., 111) could be one that has been designed to serve as an enterprise-wide emailings support service (and/or support for other forms of recipient-targeting communications, e.g., collaborative project support software such as IBM Notes™ (formerly Lotus Notes™)). In one example, a particular business organization (e.g., Chain #1 Book Stores) may wish to encourage a useful flow of information (e.g., which books are best sellers? who has more in stock, etc.) between its personnel so as to improve business organization and business operations. For example if a customer support person (sales person S1) is on the shop floor in one store trying to help a customer locate a rare specialty book, that support person S1 might use his smartphone (mobile client) 110 to contact other knowledgeable sales persons inquiring about possible other locations for the rare book. To speed the process along, the first sales person S1 (hereafter also email sender S1) may have organized his/her email app 111 to define "groups" of recipients who will simultaneously receive an emailed inquiry (e.g., does anyone have Gutenberg's 1456 Bible in stock?).

FIG. 1 depicts one such predefined group of recipients designated by email sender S1 as recipients tier RT1. Each recipient in the first tier RT1 may have his/her own predefined group of recipients to whom he/she routinely sends or forwards messages. For example a recipient R13 within the first recipients tier RT1 may have predefined a second recipients tier RT2 to whom she routinely sends questions. Similarly a recipient R32 of tier RT2 may have predefined a third recipients tier RT3 to whom he routinely sends questions.

When the recipient-targeted inquiry (e.g., does anyone have Gutenberg's 1456 Bible in stock?) hits tier RT1, some of those first tier recipients (e.g., R11, R13) may decide to be helpful by immediately forwarding the inquiry to their predefined group of friends and/or co-workers (e.g., RT2) who then do likewise for a next tier (e.g., RT3) and so on and so forth. The process can easily cascade into a chain reaction event where hundreds or thousands of members of the enterprise (e.g., Chain #1 Book Stores) receive the email although sender S1 intended for it to go to only his/her short list of recipients as defined by the first tier RT1 (e.g., recipients R11, R12, R13 and R14). As a result, automated communication assisting mechanisms such as predefined recipient groups can become ones that bog down rather than help the organization and its operations due to unintended consequences. The undesired consequences may include unnecessary consuming of worker time and of resources rather than ones that improve business efficiencies. In other words, enterprise workloads (123) are disadvantageously increased.

FIG. 1 depicts as a second email example, another one 113 having potential for undesired runaway chain reaction emailing. Here, the identity (sender S1) of the email generator is provided in a "From" field or header 114 of the email envelope 113. One or more groups and/or individuals to whom the email is targeted are listed in a "To" field or header 116 (or a CC or BCC field/header) of the email envelope. In the illustrated example email sender S1 has, perhaps on spur of the moment and thoughtlessly decided to broadcast this particular email 113 to "All Friends"; implying that it will be directed to a relatively large pool of people. The "Subject" field or header 117 of the email indicates two things in this example. First it indicates that sender S1 is not the originator of the email content (118, 119) because the "Subject" field 117 has a "Fwd" notation, meaning it is forwarding content received from another source. Second it indicates in this example that the content is not business related but rather is directed to social gossip and/or personal pictures. More specifically, in this example of possible misuse of the enterprise email system, the email 113 includes an "Attachments" header 118 which reports that this email has several large data files attached to it; for example a bit-mapped (BMP) first large picture (Pic1, 10 MegaBytes) and an MP3 encoded movie (Pic2, 20 MegaBytes). The body field 119 of the email includes language indicating it is probably not business related (e.g., "Check out this funny video"). Human nature being what it is, if the video actually is a funny one, the email envelope 113 with its voluminous data contents (e.g., Pic1, Pic2) is likely to virally spread throughout the organization.

In cases where numerous members of the respective recipient tiers RT1, RT2, RT3, etc. of the illustrated emailing hierarchy cause the initial one email 113 to be replicated and forwarded (either automatically or by way of manual decision making) to a geometrically expanding pool of yet more recipients, efficiency of resource use and worker efficiency may suffer. Typically it will not be just one indiscriminately propagated email such as 113 that plagues the enterprise but rather thousands of such targeted messagings clogging the pipes of the system day in and day out. Resources of the system that carry, store, process and further forward the replicated email 113 may include wireless and wired portions of the communications link 115 that have limited bandwidth; data servicing software modules that are in short supply and/or servers within the Internet portion 120 that are already strained by enterprise-external tasks. The same may be true for further software modules and/or servers within the "cloud" 130 and communication resources within the illustrated, second communications link 125. (In actuality, although shown outside, the "cloud" 130 may be embedded or enmeshed within Internet 120 and the first and second communications links 115, 125 may be inseparably integrated one with the other. They are shown separately for the purpose of depicting how tasks may be delegated out over various resource and communications portions of the overall system 100. The Internet portion may be replaced by an enterprise-dedicated Intranet.)

If all the different parts of the system 100 are operating as preplanned, the cloud-based resources (130) will timely and properly perform their delegated tasks, timely return results to the task delegators (e.g., in 120) and the latter will then timely return appropriate results to client hardware and software resources of mobile device 110 whereby the user is able to quickly obtain desired results (e.g., locating the rare book). On the other hand, if thousands or more of emails (e.g., 113) with large attachment files (e.g., 118) are senselessly filling up the communication channels (e.g., 115, 125, 145, 147a) and available storage spaces (e.g., 142, 148) and are unnecessary utilizing the data processing bandwidths of system data processors (e.g., 141), then system users may not experience the desired timely results. By timely, it is often meant (depending on the task at hand) that the user experiences a request-to-results latency time of no more than a second or two. However, delegated flows of data processing, storing and/or communication tasks may fail to deliver on time due to congestions, interferences, intermittent and creeping-wise growing problems such as virally spreading unnecessary emails (e.g., 113) within the system 100.

Typically, the system 100 is subdivided into management-defined "sections". The size and resources inventory of each section is left to mangers of the system, but generally each section; where 140 is an examples of a system section, includes a limited number of intercoupled, "local" resources such as one or more local data processing units (e.g., CPU 141), one or more local data storage units (e.g., RAM 142, ROM 143, Disk 146), one or more local data communication units (e.g., COMM unit 147), and a local backbone (e.g., local bus 145) that operatively couples them together as well as optionally coupling them to yet further ones of local resources 148. The other local resources 148 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), user interface terminals (e.g., 144) and so on.

It is to be understood that various ones of the merely exemplary and illustrated, "local" resource units (e.g., 141-148) may include or may be differentiated into more refined kinds. For example, the local CPU's (only one shown as 141) may include single core, multicore and integrated-with-GPU kinds. The local storage units (e.g., 142, 143, 146) may include high speed SRAM, DRAM kinds as well as configured for reprogrammable, nonvolatile solid state storage and/or magnetic and/or other phase change kinds. The local communication-implementing units (only one shown as 147) may operatively couple to various external data communicating links such as serial, parallel, optical, wired or wireless kinds typically operating in accordance with various ones of predetermined communication protocols. Similarly, the other local resources (only one shown as 147) may operatively couple to various external electromagnetic or other linkages 148a and typically operate in accordance with various ones of predetermined operating protocols.

The expected "normal" behaviors for the various local resources 141-148 of the given, local section 140 are defined by system planning managers of local section 140. Typically they do not envisage and plan for viral waves of junk or otherwise unnecessary emails such as 113. Yet such emailings do occur. Simply begging end users to not abuse the system rarely works because every user has a justification for why his/her originated, or mass forwarded, email (e.g., 113) is a useful one rather than an unnecessary one.

Figure 2:
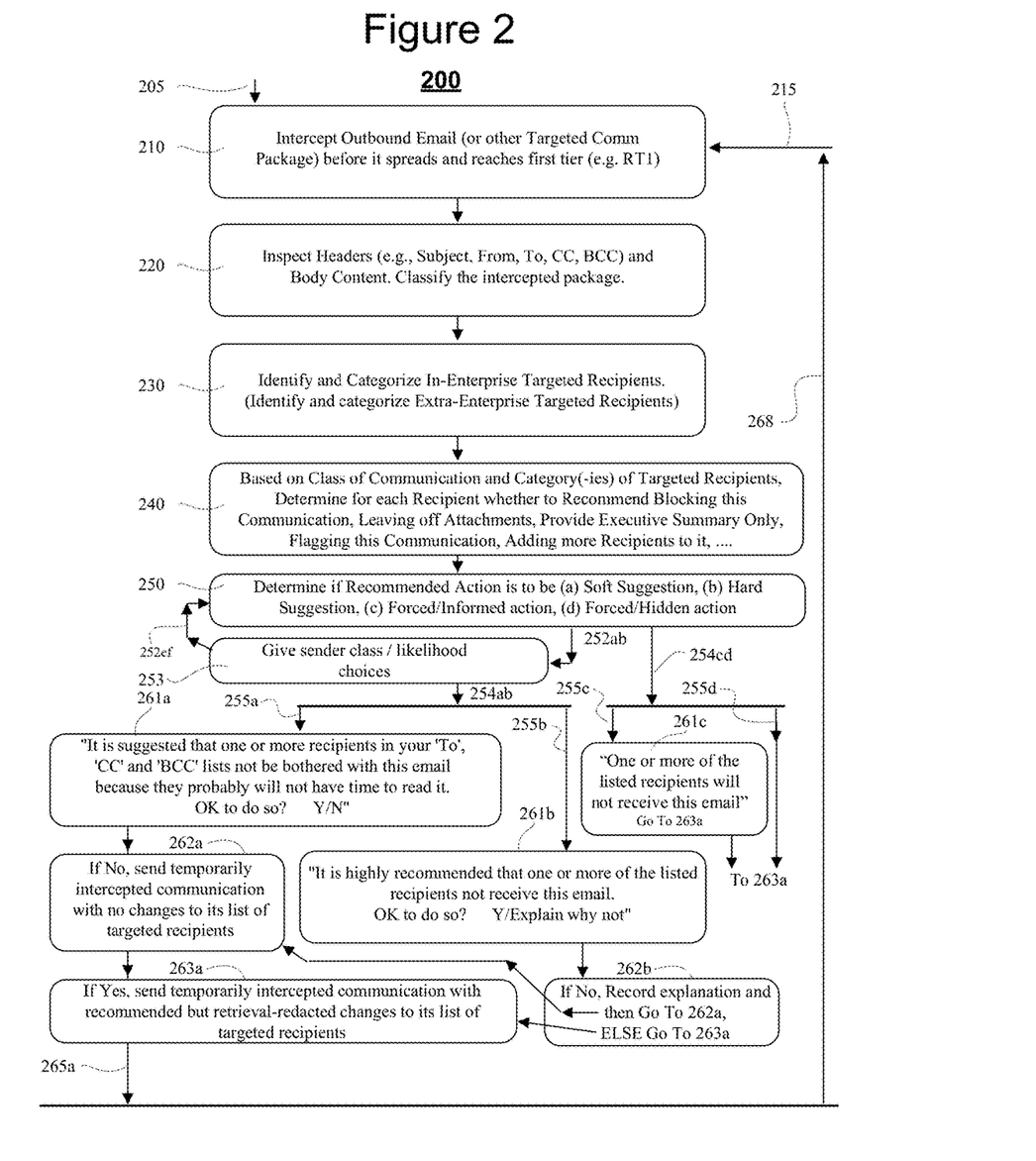
FIG. 2 is a flow chart depicting an automated process for intercepting emails (or other forms of recipients-targeting communications) and determining what to do with them.

Referring to FIG. 2, an emails (or other forms of recipient-targeting communications) intercepting and constraining method 200 in accordance with the present disclosure is described. Initial entry may be made at 205 into machine-implemented, and automatically repeatedly carried out step 210. At step 210 every one of, or a substantial percentage of outbound emails (or other forms of recipient-targeting communications, e.g., 113) are automatically intercepted between when they leave an enterprise-controlled, sourcing terminal (e.g., client 110 or 144) and they propagate and spread out to a first tier RT1 of recipients. By "enterprise", it is meant here that the involved users and associated resources are part of a managed organization in which it is permissible (e.g., the involved users have agreed to it) to intercept, analyze and sometimes automatically block, re-direct, or expand CC/BCC lists of emails (or other forms of recipient-targeted communications) originated and/or forwarded by intra-organization members.

For this to happen, and in one embodiment, all emails (or other forms of recipient-targeting communications) originated and/or forwarded by intra-enterprise members (e.g., sender/recipient Rnm of FIG. 1) are automatically transmitted to and processed by an enterprise emails (or other forms of recipient-targeting communications) server such as the illustrated one 135 of FIG. 1. It is within the contemplation of the present disclosure to have many more such emails/others processing servers like 135 distributed throughout the system 100. The illustrated location of the emails/others server 135 in the cloud portion 130 of the exemplary system 100 of FIG. 1 is merely by way of example. It could have instead been located in the Internet portion 120 or in an Intranet portion (not shown) of enterprise managed resources. Couplings 153a-153b-153c-153d of the exemplary enterprise emails/others server 135 connect it to other parts of enterprise resources (e.g., to emails/others interactions tracker 151, to anonymizing interactions database 152 and to expert knowledge base 155). These illustrated couplings 153a-153d are merely also for purpose of example. Through various wired and/or wireless couplings (not all shown), the enterprise emails/others server 135 (or its functional twins—not shown) can have access to emails/others originated and/or forwarded by intra-enterprise resources such as intra-enterprise mobile client device 110 (when functioning as an intra-enterprise resource) and other intra-enterprise client devices (e.g., of recipients tiers RT1-RT3—etc.), including for example, the enterprise-managed terminal 144 which is shown in FIG. 1 as being used by sender/recipient Rnm.

While not explicitly shown in FIG. 1, it is to be understood that before launched emails or other forms of recipients-targeting communications (e.g., 113) are received recipient accessible storage areas of recipients targeted by the recipients-targeting communications (e.g., email InBoxes of respective users), those launched recipients-targeting communications (e.g., 113) can be intercepted for automated scrutinizing for software viruses, security breaches and/or other such potentially harmful attributes. In accordance with the present disclosure, there is provided an automatic intercepting of all or a predetermined percentage of launched recipients-targeting communications before each is received in recipient accessible storage areas of recipients targeted by the recipients-targeting communication. This is followed by an automatic first determining of one or more classifications of the intercepted communication (as shall be detailed below); by an automatic second determining of one or more categorizations of one or more of targeted recipients of the intercepted communication (as shall be detailed below); and then based on the first determined one or more classifications of the intercepted communication and on the second determined one or more categorizations of the at least one of the targeted recipients, by a third determining of whether the intercepted communication should be allowed to proceed as is for receipt in respective recipient accessible storage areas of the one or more categorized recipients; and doing something in response to the third determining indicating that the intercepted communication should not be allowed to proceed as is (e.g., without deleting one of the targeted recipients and/or leaving out part of the content of the communication before it proceeds) to a respective one or more of recipient accessible storage areas of the categorized recipients, where the response includes preventing the intercepted communication from proceeding as is to one or more respective recipient accessible storage areas of at least one of the categorized recipients. Other forms of automated response, such as adding inadvertently left-out recipients or providing only an executive summary of the intercepted communication to certain categories of targeted recipients will be discussed below.

Referring to step 220 of FIG. 2, after interception, the intercepted enterprise emails/others are automatically inspected and classified. Specific classifications may vary from enterprise to enterprise and/or application to application. The classifications may include, but are not limited to: (1) the nature of the communication—is it social, business or both?; (2) the urgency of the communication—is it a short fuse matter or can response to it wait and if so for how long?; (3) the privacy nature of the communication—is it for public distribution, for limited distribution or restricted to only those having need to know as based on topic and/or other classification attributes of the communication?; (4) the topic of the communication—does it relate to enterprise software? to enterprise hardware? to enterprise finances? to enterprise personnel management? to enterprise miscellaneous or other topics? and (5) the subtopic of the communication—if for example it relates to enterprise software; is it reporting a possible bug? detailing a diagnosis of the bug? providing a short-term solution/fix for the bug? reporting audited performance and/or financial consequences of the bug? providing long term reorganization plans in view of the bug? and so forth.

More generally, the automatic determining of one or more classifications of the intercepted communication can include automatically analyzing at least one of a transmission envelope of the intercepted communication, of metadata of the intercepted communication, of body content of the intercepted communication and of attachments of the intercepted communication. The automatic analyzing of the transmission envelope can include automatically analyzing at least one of a recipients identifying portion of the envelope, a sender identifying portion of the envelope, a subject matter identifying portion of the envelope, an urgency indicating portion of the envelope and a time stamp portion of the envelope. The automatic analyzing of the metadata can include automatically analyzing at least one of a recipients identifying portion of the metadata, a sender identifying portion of the metadata, a subject matter identifying portion of the metadata, an urgency indicating portion of the metadata and a time stamp portion of the metadata. The automatic analyzing of the body content and/or attachments can include at least one of automatically analyzing the body content and/or attachments using natural language processing and automatically searching the body content and/or attachments for one or more predetermined key words, key symbols or catch phrases. The determined one or more classifications can include at least one of: whether the intercepted communication is classifiable as being large, medium or small in size; whether the intercepted communication includes subject matter covering enterprise operations; whether the intercepted communication includes subject matter covering social interactions; and whether the intercepted communication includes subject matter covering humor or merely graphical matter. In a case where the determined one or more classifications indicates the intercepted communication includes subject matter covering enterprise operations, the determined one or more classifications can include at least one of: whether the intercepted communication includes subject matter covering enterprise executive administration, covering enterprise finances, covering enterprise customer relations, covering enterprise hardware resources and covering enterprise software resources.

Figure 3:
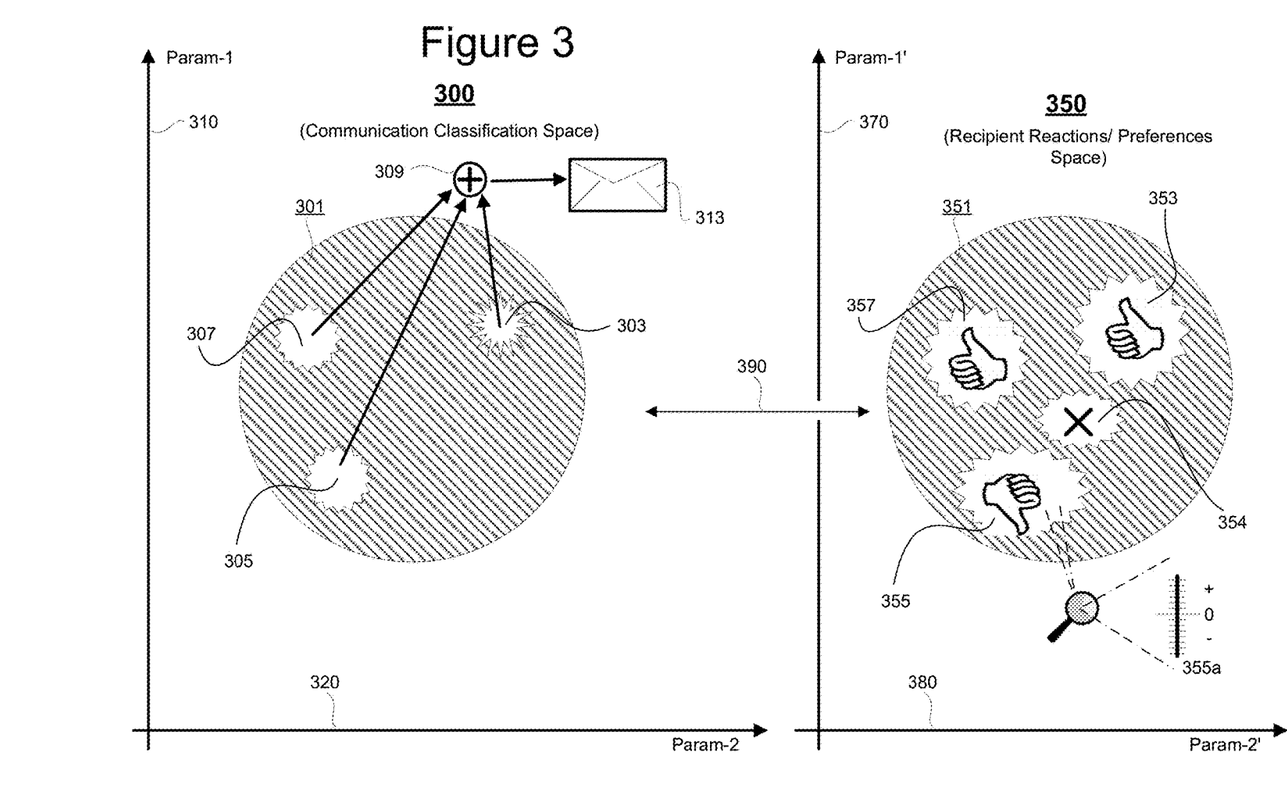
FIG. 3 is a Venn like diagram illustrating one possible cross correlating mapping between classifications of an intercepted communication and categorizations of likely recipient reactions and preferences with respect to so-classified communications.

Referring briefly to portion 300 of FIG. 3, shaded area 301 may represent a cross section of a multi-dimensional mapping in a multi-dimensional space where the space defines possible classifications that an intercepted communication (e.g., email 313) may receive. The irregularly shaped and white shaded regions, 303, 305, 307 may represent parts of the classifications space 300 that a specific email (e.g., 313) occupies. First and second classification parameter axes 310 and 320 may represent any of user selected classification attributes such as, merely for sake of example, reply-urgency (e.g., how quickly must the recipient reply) and difficulty level of inquiry being made (e.g., what level of formal education should the recipient have). It could be that there are three separate inquiries within the one email envelope 313 or it could be that an automated classification mechanism assigns the three regions, 303, 305 and 307 as a unified classification 309 to email envelope 313 for various reasons.

Returning to step 220 of FIG. 2 In order to classify the intercepted enterprise communication (e.g., 113, 313), one or more data processing resources of the enterprise (e.g., 141) automatically inspect one or more parts of the intercepted communication, including for example, but not limited to, various headers and/or fields and/or meta-data portions of the communication such as its "Subject" field (e.g., "Re Proposed Bug Fix"), its "From" field (e.g., "Crash_Investigation_Team@Enterpise.com", its "To" field (e.g., "CEO-@Enterpise.com"), and its carbon-copy and/or blind carbon-copy fields (e.g., "CC: Bug.Finder@Enterpise.com", "BCC: CTO@Enterpise.com"). Additionally, natural language processing tools (NLP—for example stored in ROM 143) may be used to analyze the body content of the intercepted communication for finding predefined keywords, catch-phrases and the like for better machine understanding of the nature of the intercepted communication. The inspections of the one or more parts of the intercepted enterprise communication (e.g., 113, 313) lead, in one embodiment, to the demarcations (e.g., 303, 305, 307) made in communications classification space 300 for classifying the corresponding communication. In an alternate or the same embodiment, an expert knowledge base system (155) automatically determines one or more classifications to be assigned to the intercepted enterprise communication (e.g., 113, 313) based on various predetermined or heuristically learned attributes and correspondingly generated expert rules for classifying intercepted communications. An example of such a classifying rule might be: IF Email.Subject_Field includes *bug* THEN Topic=: Bug_Fix ELSE IF Email.Subject_Field includes *quarterly* THEN Topic=: Finance ELSE . . . .

It is to be understood incidentally, that although the expert knowledge base system 155 is illustrated in FIG. 1 as a single unit configured for classifying intercepted communications, categorizing targeted recipients and dynamically generating anonymizing recommendations regarding what next to do with the intercepted communications based on the classifications assigned to the intercepted communications and based on the categorizations assigned to their targeted recipients, it is within the contemplation of the present disclosure to have multiple separate units distributed within the data-handling machine system 100 for separately carrying out the processes of classifying intercepted communications, categorizing targeted recipients and dynamically generating anonymizing recommendations regarding what next to do with the intercepted communications based on the classifications assigned to the intercepted communications and based on the categorizations assigned to their targeted recipients. Also it is to be understood that the intercepting of launched ones of the recipients-targeting communications (e.g., emails) can be carried out within enterprise emails server 135 or by a separate unit (not shown) outside server 135 but operatively coupled to and cooperative with the enterprise emails server 135 so that substantially same results are obtained (e.g., unnecessary and enterprise-degrading ones of the intercepted communications are blocked or trimmed down in size and/or in terms of the size of recipient populations they reach.)

At step 230, the targeted recipients of the intercepted enterprise emails/others (e.g., 113, 313) are automatically identified and categorized. As used herein, the term "categorize" can have two different meanings. For the case of step 230 it means that intra-enterprise recipients have already been pre-categorized with respect to their routine post-receipt behaviors and now the system is looking up those post-receipt behaviors using its anonymizing interactions database 152. Examples of such predetermined post-receipt behaviors may include, but are not limited to: (1) routinely ignores communications of this classification; (2) routinely forwards communications of this classification to many others; (3) routinely replies to the sender for communications of this kind; (4) routinely performs post-receipt research relating to the topic of the communication; (5) routinely and quickly reports results of post-receipt research to others; and so on.

Another example of post-receipt behaviors includes, but are not limited to: (1) routinely indicates a strong like for this kind (classification) of communication; (2) routinely indicates a mild like for this kind; (3) generally is neutral with respect to this kind of communication; (4) routinely indicates a mild dislike for this kind; and (5) routinely indicates a strong dislike for this kind (classification) of communication.

More generally, the determined one or more categorizations of the one or more of targeted recipients can include at least one of: whether one of the targeted recipients routinely does not access communications of a given classification even though it is received in a recipient accessible storage area of the targeted recipient; whether one of the targeted recipients routinely forwards communications of a given classification to further and relatively large numbers of other recipients; whether one of the targeted recipients routinely forwards communications of a given classification to further other recipients who are not authorized to receive communications of that given classification and so forth.

Referring again to FIG. 3, portion 350 represents a recipient reaction space. Shaded area 351 may represent a cross section of a multi-dimensional mapping in a per-user or per-kind-of-user, multi-dimensional space where the space defines possible categories of post-receipt reaction and/or behavior to various classifications of intercepted communication (e.g., email 313). The irregularly shaped and white shaded regions, 353, 355, 357 may represent parts of the recipient categorization space 350 that a specific user (e.g., Rnm) or cluster of users occupies. First and second categorization parameter axes 370 and 380 may map to classification axes 310 and 320 so that portions 300 and 350 may be overlaid (390) one on the other for purpose of determining how a specific user (e.g., Rnm) or cluster of users reacts and/or otherwise behaves in response to receipt of a correspondingly classified communication (e.g., 313). The recipient categorization axes 370 and 380 may represent any of user selected categorization attributes such as, merely for sake of example, speed of opening email based on (or independent of) its stated level of reply-urgency and level of formal education the recipient has). In the illustrated example, white shaded region 353 categorizes the specific user (e.g., Rnm) or pre-categorized cluster of users as having a positive reaction in this region of the mapped recipient reaction space. White shaded region 357 also categorizes the user/group of users reaction as positive. White shaded region 354 categorizes the user/group of users reaction as don't care or neutral. White shaded region 355 categorizes the user/group reaction as negative. In one embodiment, the respective reactions of the specific user or group of users to corresponding communication classes (303, 305, 307) is summed to determine an overall reaction to the communication. In one variation, user reaction categorization is not a yes or no value (e.g., like versus dislike) but rather it is given a numerical value, for example on a scale of −10 to +10 (or −100 to +100) as depicted for example by intensity indicator 355a. Similarly degree of conformance of a given communication (e.g., 313) to different subregions of classification space 300 may be given numerical values, for example on a scale of −10 to +10 (or −100 to +100) rather than being binary values. A cross-space set of multiplications may be carried out (on a classification point versus corresponding user categorization point basis) and the products may be added to come up with a summed or weighted sum determination of the likely user or user group reaction and/or post-receipt behavior in light of the classification attributes given to the intercepted communication (e.g., email 313). This may guide the determination of what to do next for each intercepted communication and correspondingly targeted individual user or group of users. In an alternate or the same embodiment, an expert knowledge base system (155) automatically determines one or more post-receipt categorizations to be assigned to respective recipients or groups of recipients and how those cross map to classification attributes assigned to the intercepted enterprise communication (e.g., 113, 313). The decisions of the expert knowledge base system may be based on various predetermined or heuristically learned attributes and correspondingly generated expert rules for categorizing targeted recipients. An example of such a categorizing rule might be: IF Recipient.Title includes *President* THEN Organization.Level=: Administration ELSE IF Recipient.Title includes *staff* THEN Organization.Level=: Technical ELSE . . . .

At step 240 of FIG. 2, a determination of what action to next recommend (or enforce) is automatically made based on the one or more classes (and/or degrees of classifications) assigned to the intercepted communication and based on the one or more categories (and/or degrees of categorization) assigned to respective individual ones of the targeted recipients or groups of targeted recipients. Examples of next recommended (or enforced) actions include: (1) Recommend preventing the whole of this communication from being delivered to respective individual ones of the targeted recipients or groups among the targeted recipients; (2) Recommend preventing one or more parts (e.g., attachments, body content) of this communication from being delivered to respective individual ones of the targeted recipients or groups among the targeted recipients; (3) Recommend that only an executive summary of this communication be delivered to respective individual ones of the targeted recipients (e.g., the CEO) or groups among the targeted recipients; (4) Recommend specially flagging this communication (e.g., extremely urgent; merely FYI, for your eyes only, etc.) before allowing it to be delivered to respective individual ones of the targeted recipients or groups among the targeted recipients; and (5) Recommend adding one or more further individuals or groups to the non-blocked other recipients before allowing it to be delivered to respective individual ones of the targeted recipients or groups among the targeted recipients. In an alternate or the same embodiment, an expert knowledge base system (155) automatically determines one or more forms of recommendation or forced action to be assigned to respective combinations of communication classifications (e.g., 303, 305, 307) and recipients categorizations (e.g., 353, 354, 355, 357 of FIG. 3). The decisions of the expert knowledge base system may be based on various predetermined or heuristically learned attributes and correspondingly generated expert rules for making recommendations. An example of such a recommendation making rule might be: IF Recipient.Cat includes Organization.Level.Administration AND Comm.Class includes Topic.Bug_Fix AND Comm.Urgency is Low THEN Recommendation=: Recipient.Delete ELSE IF Comm.Urgency is Medium THEN Recommendation=: Recipient.Exec-_Summary.Only ELSE . . . .

By selectively curtailing what is sent (if at all) to various individual ones of the targeted recipients or groups among the targeted recipients based on the communication classifying operation carried out in step 220 and based on the recipient(s) categorizing operation carried out in step 230, it is possible to reduce workload burdens both on individuals within the organization and on organization resources. Consider as a more specific example, the Chief Executive Officer (CEO) of a large corporation. Some lower level managers in the organization may believe that they need to include the CEO as a CC recipient in almost every email they send out. However, the CEO may not have either the time to review every such email or interest in doing so. By automatically paring off the CEO from the CC list while not directly letting the sender (e.g., S1) know that this was done, egos are preserved and at the same time the CEO is not burdened with long lists of emails in his InBox that he/she will never read. Additionally, system memory space is not wasted in storing content (e.g., attachments and/or long body contents) that will never be looked at. System communication bandwidth is not wasted in transmitting content (e.g., large attachments and/or long body contents) that will never be looked at. In one embodiment, because the intercepted communication (e.g., 313) has already been classified in step 220, an executive summary of the communication is automatically generated and only that executive summary is sent to certain busy members of the enterprise (e.g., the CEO, the CTO) simply so that the busy member can get a summarized idea of frequency and extent to which collaborative communications are streaming back and forth within his/her organization. The summary may merely indicate topic, number of people/groups involved and frequency of such communications (e.g., emails per day). In this way the busy member (e.g., the CEO, the CTO) can get a quick idea of what topics are hot and consuming human resources within the organization without having to get into the details.

Once the various to-be recommended courses of action (or to-be enforced courses of action) have been determined in step 240, in subsequent step 250 determinations are automatically made as to how best to present the recommendations, if at all, to the sender. While not explicitly depicted for step 250, a preferred aspect of the automated presentation of recommendation is that the sender (e.g., S1 of FIG. 1) not be able to learn which recipients are being referred to (e.g., for preventing transmittal of the email to them) or specifically why. In other words, anonymity of recipient post-receipt behavior is preserved. For example, rather than informing a sender (e.g., S1) to the effect that, "It is recommended that recipient R14 (a.k.a. CEO Jones) be removed from your 'To' list before the sending of the this email is completed because recipient R14 is a person who routinely redirects emails to his/her trash folder if you are the sender"; the anonymized recommendation might indicate, "It is suggested that one or more recipients in your 'To', 'CC' and 'BCC' lists not be bothered with this email because they probably will not have time to read it. OK to do so? Y/N". Then if the sender clicks on the Yes option, the system does not show him the revised list of targeted recipients such that the sender can figure out who the removed person or persons are. When the sender later retrieves the email from the 'Sent emails' folder, its 'To', 'CC' and 'BCC' are automatically redacted. In one embodiment, the list of targeted recipients must be larger than a predetermined number of recipients (e.g., more than 5 or 10 different individuals) so that the sender cannot easily determine who was deleted or why. In one embodiment, if the list of targeted recipients is relatively small (e.g., less than 5 or 10 different individuals) such that it may become relatively simple for the sender to determine who was deleted, the system first automatically forces an addition to the visible To, CC, BCC lists of a large number of faked further recipients (ones or groups of them who will not actually get the email) and after that the system informs the sender that an unnamed one needs to be removed. In this way, the sender is less likely to guess which one is being removed and why. To cover up the addition of the faked further recipients, the system later automatically informs the sender that a few of the sent emails may have not gotten through. Typically, the faked further recipients are presented as strangely named groups (e.g., Temporary.BugFix.Committee.A51) whose members the sender is not privileged to discover.

As indicated in block 250 of method 200, there are several options with respect to how best to present the recommendations, if at all: (a) the Soft Suggestion approach; (b) the Hard Suggestion approach; (c) the Forced/Informed action option; and the (d) the Forced/Hidden action option. As depicted by paths option 252*ab*-254*ab*-255*a* and in block 261*a* (where intervening and optional block 253 will be described below), the Soft Suggestion approach may follow the above first given example, "It is suggested that one or more recipients in your 'To', 'CC' and 'BCC' lists not be bothered with this email because they probably will not have time to read it. OK to do so? Y/N". In other words, the sender is politely asked to cooperate but can easily respond with a No. If the sender responds with a No (N) then step 262*a* is carried out. The temporarily intercepted communication (e.g., 313) is sent on its way with no changes made to its list of targeted recipients. If the sender responds with a Yes (Y) then step 263*a* is carried out. The temporarily intercepted communication (e.g., 313) is changed in an anonymity preserving way such that no one can easily learn who was deleted, the agreed-to changes to the list of targeted recipients is made in a retrieval-redacting manner and the changed communication is then sent on its way. At the recipient end, each recipient sees only his/her name as being a targeted recipient.

As depicted by paths option 252*ab*-254*ab*-255*b* and in block 261*b* (where intervening and optional block 253 will be described below), the Hard Suggestion approach may take a dialog form such as: "It is highly recommended that one or more of the listed recipients not receive this email. OK to do so? Yes/Explain why not". This provides less information as to why one or more of the recipients is deleted and it makes it harder for the sender (e.g., S1) to say No. For a No to take effect, the sender has to provide a reason that is recorded. In one embodiment, the system further interacts with the sender by for example challenging the reason given before allowing the communication to go through to the original list of recipients.

As depicted by paths option 254*cd*-255*c* and in block 261*c*, the Forced/Informed action option does not ask for permission and instead just carries out the selected action, but at the same time informs the sender that this has been done. A Forced/Informed action option may be exercised for example if an enterprise security policy will otherwise be violated. The Informed action part may or may not let the sender know the reason for the forcing of the action. As another example, if the deleted recipient is the organization CEO because the CEO has indicated (by way of survey or automated recipient policy—both discussed below) that he/she absolutely does not want to receive this classification of emails (or of other form of recipient-targeting communication) then the deletion is forced.

As depicted by path option 254*cd*-255*d*, the Forced/Hidden action option does not ask for permission and does not inform the sender that this has been done. Control passes to step 263*a* wherein the determined transmittal altering action is carried out. Subsequent to step 263*a* control passes by way of paths 265*a*, 268 and 215 back to block 210 for interception of yet further enterprise emails/others.

Referring to block 253, which is optional and if carried out is interposed between otherwise connected control passing paths 252*ab* and 254*ab*, in one embodiment and for the case where the determination of step 250 was either (a) Soft Suggestion or (b) Hard Suggestion; the sender is provided with one or more re-classification and/or information-expanding options. The information-expanding option may be presented for example in the following form: "The current classification(s) for this message is/are: C_Name_309 (click here to see attributes and subclasses and re-class options) and probabilities of likely recipient behaviors is/are: 85% that one or more recipients will feel annoyed in receiving this communication; 90% that one or more recipients will delete this message without reading it; 25% that one or more recipients will write back to you complaining about being listed as a recipient; 6% that one or more recipients will write to your supervisor complaining about being listed as a recipient. Given it is suggested that . . . ((control passes to 261*a* or 261*b*))". In the foregoing the text inside the double parentheses (( . . . )) is not displayed and instead the respective soft or hard suggestions of steps 261*a* or 261*b* are displayed. The information-expanding option therefore provides the sender with a list of computed probabilities of likely consequences of sending the communication while still not revealing who among the targeted recipients will be the one or ones who react negatively to receipt. Although the exemplary list of likely outcomes given here includes only negative outcomes, it is within the contemplation of the present disclosure to include positive likelihoods as well, for example: "and 4% that one or more recipients will write to your supervisor praising you for having listed them as a recipient . . . ".

Additionally, in the given example of the information-expanding option, the C_Name_309 item is replaced by an actual classification name. For example an actual classification name might be, "Combined Gossip and Social Media Pictures and Social Event Invitation". Referring back to classification space 300 of FIG. 3, the exemplary C_Name_309 phrase may have been picked out because the communication (313) has classification attributes (e.g., ranges along parameter axes 310 and 320 as well as additional ranges along other parameter axes of the multi-dimensional classification space 300 of FIG. 3 where the other axes are not shown) that cause it to simultaneously cross correlate with a "Gossip" classification region (e.g., 303) and a Social Media Pictures classification region (e.g., 307) and a Social Event Invitation classification region (e.g., 307). The combination of all of these classification regions is represented in FIG. 3 by the summation symbol 309 as assigned to communication 313. However, the sender may disagree with the automatically machine-generated classification 309 and may instead want to propose a re-classification of the communication or a split of the communication into plural and further edited ones, each having a different set of targeted recipients. In such a case, the user activates the "click here to see attributes and subclasses and re-class options" option. The user is then presented with a further set of menu choices as well as an attributes mapping similar to that of portion 300 of FIG. 3 so that the user can graphically or otherwise propose a red-drawing of the classification boundary lines for his/her communication such that it will be differently classified. The user is also presented with an option of dealing with the different sub-classifications (e.g., 303, 305, 307) as user-chosen sets. More specifically, the user may specify an additive union of regions 303 and 307 but excluding 305. The user may specify other set designations, for example if two classifications overlap (not shown, call them A and B) and the user wishes to separately deal with the subclass where both of A and B are present and the subclass where only A is present but not B and so on. For each separately specified combination, the user may choose a different course of transmittal action and different paring down or expansion of the list of targeted recipients. If the user chooses any of these options, then path 252*ef* is taken, returning the modified and/or user-reclassified communication back to step 250 for re-determination of next course of action based on the changes.

In one embodiment, the system abides by the user made choices as to proper classification of his/her communication (e.g., 313). In an alternate embodiment, the system merely takes it as an adaptive learning input of how it should perform its own classification of the communication with different weights of adoption being given to different users within the system, for example based on their hierarchical level within the enterprise.

It is to be understood that the above is not intended to be limiting and that FIG. 2 does not show all of the automatically determined interception options based on machine-determined message classification and/or user-suggested/commanded message classification. The same also applies to the recipient categorizing attributes of portion 350 of FIG. 3. For example, FIG. 2 does not explicitly show the options of selectively leaving off parts of the communication (and/or re-classifying them) or only sending an executive summary or adding additional recipients that may have inadvertently been left of the list of intended recipients or specially flagging the message for certain recipients. However, the carrying out of such further options can follow the same soft, hard, forced options as those described for paring down the list of originally specified recipients.

Referring in more detail to the right side (portion 350) of FIG. 3, the depicted regions of likes (e.g., 353, 357) and dislikes (e.g., 355) for a given recipient or a defined "cluster" of alike recipients is merely an example of recipient preferences for different kinds of targeted communications (e.g., emails) where the different kinds of targeted communications are classified in portion 350 by the parameter attributes (e.g., Param-1', Param-2') of that multi-dimensional mapping space 350. Those parameter attributes (e.g., Param-1', Param-2') are not necessarily exactly the same as those (e.g., Param-1, Param-2) of the left side mapping space 300. However, in most cases they will be approximately the same or easily mapped on a point-by-point basis from one to the other so that with appropriate mapping, multi-dimensional globe 351 (or another multi-dimensional shape) can be overlaid with multi-dimensional globe 301 (or another corresponding multi-dimensional shape) and thus, for each classification(s) of an intercepted communication (e.g., 313), the corresponding recipient preferences can be automatically determined and then a decision can be made (e.g., with the aid of an expert knowledge database 155) respecting how to automatically processes the intercepted communication for that recipient (e.g., R14, a.k.a. CEO Jones), namely, block it, don't block it and so on. The preferences (e.g., 353, 354, 355, 357) of each pre-categorized recipient need not be specified as binary/trinary ones (e.g., like, dislike, don't care) or as numerically specified ones (e.g., polarity-wise specified likes on a scale of minus 10 to plus 10) but rather can be alternatively or additionally specified in terms of what portions of an intercepted communication (e.g., attachments, detailed description part, abstract part, just the Subject heading, executive summary) the recipient in question prefers strongly or not so much to receive or not to receive.

Figure 4:
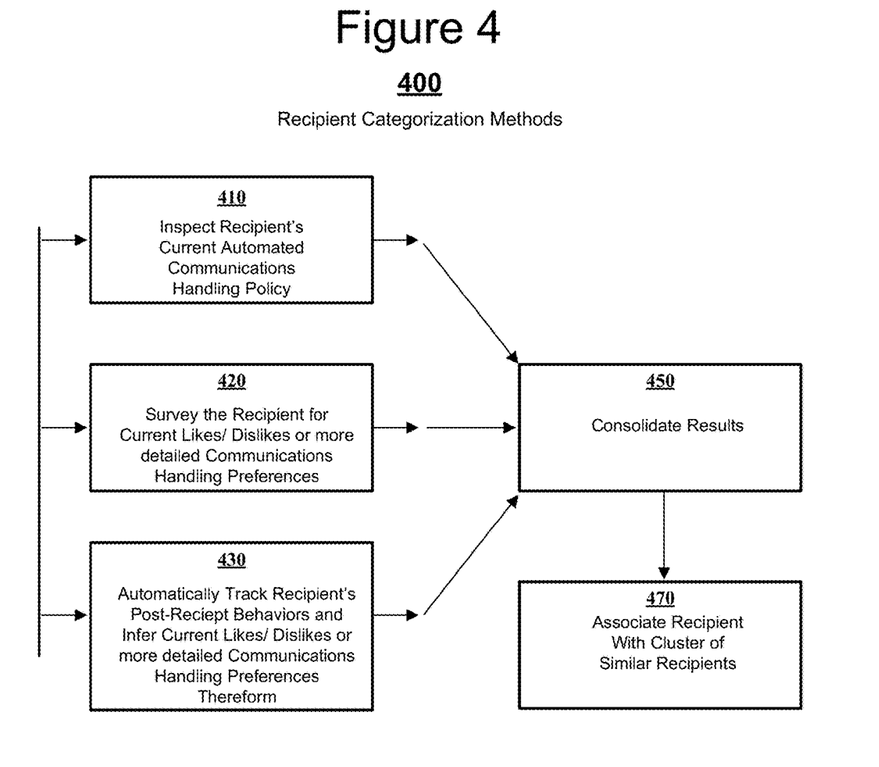
FIG. 4 is a block diagram a subsystem for associating targeted recipients with clusters of alike behaving recipients of similar communications.

Referring next to FIG. 4, a set 400 of recipient categorizing methods (410, 420, 430) will be broadly described. Any one or more of the depicted categorizing methods (410, 420, 430) or approximate equivalents thereof may be carried out or omitted. If two or more of the depicted categorizing methods (410, 420, 430) are used, a consolidating step 450 may be employed to reconcile differences and/or merge the results together. Additionally, in one embodiment, after an individualized categorization for one specified recipient (e.g., R14) is generated, the generated categorization may be matched with or merged into a more generalized categorization for a "cluster" of alike behaving recipients. The latter step is represented by block 470. An advantage of using cluster categorizations rather than individualized ones is that less system memory space need be used. Also the generalized categorization over a statistically significant "cluster" of alike behaving recipients may provide better results (e.g., less idiosyncratic) than ones developed on an individual by individual basis.

Block 410 depicts an automated inspecting of a user's current automated communications handling policies. These may define what the user routinely considers to be spam and/or communications of high urgency, low urgency and so forth. One set of automated communications handling policies which is generally ignored if encountered, is the user's while-on-vacation policy because that one is not indicative of the user's routine behaviors (unless the user is always vacationing). In other words, if the user has already gone through the trouble of setting up a set of automated communications handling policies for him/herself, the recipient categorizing methods 400 need not revisit the same territory afresh but may instead adopt whatever useful categorizing information is already present in the user's current automated communications handling policies.

Block 420 depicts an automated surveying process. Here, when the system detects that the user has some spare time it may automatically and interactively survey the user for his/her likes and dislikes with respect to different classes of emails (or of other forms of recipient-targeting communications). For example: "Do you like to receive emails that contain gossip, Y/N?"; "Do you like to receive emails that include large attachments, Y/N?"; "Do you like to receive emails directed to the topic of organization finances, of organization legal issues, of organization human resources (HR) issues, of problems with organization hardware resources, organization software resources?" and so on. The surveys may be conducted in small increments and over a long course of time (e.g., weeks, months) so that the user is not burdened all at once with specifying his/her preferences.

Block 430 depicts an automated recipient-behavior tracking process. Here, rather than relying on a user's verbal or written responses as in blocks 410 and 420, the system determines what the user actually does with respect to receipt of different kinds (classes) of recipient targeted communications.

Figure 5:
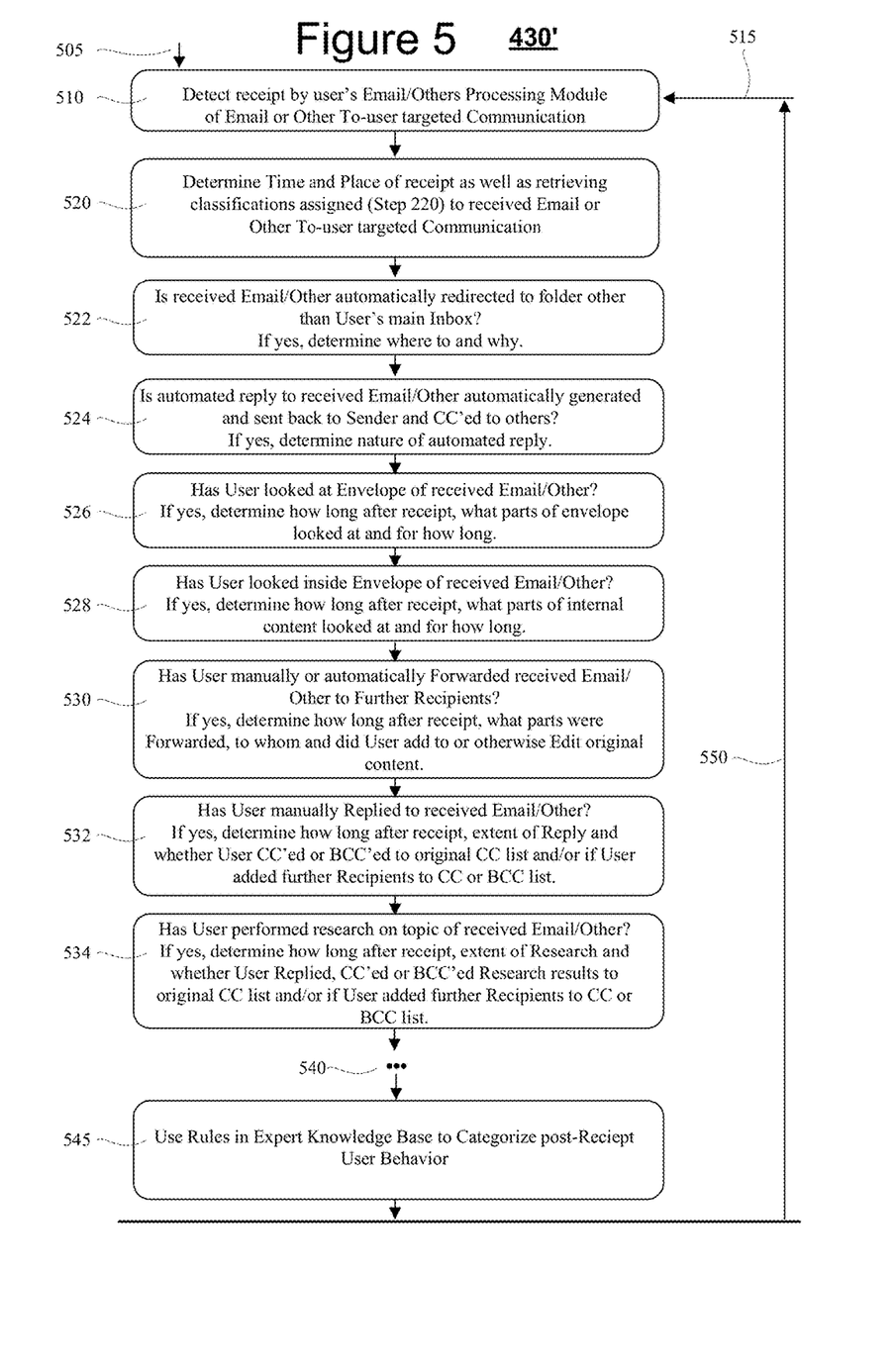
FIG. 5 is a flow chart depicting an automated process for tracking post-receipt behaviors of targeted recipients.

A more detailed example of the process of block 430 is depicted as 430' in FIG. 5. Initial entry may be made by path 505 into step 510. Step 510 uses an emails/others interactions tracker (e.g., 151 of FIG. 1) to automatically detect receipt by the user's Email/Others processing module (not explicitly shown, could be part of enterprise emails server 135) of an email or another to-user targeted communication (e.g., 113, 313). Subsequent step 520 determines the time and place (geographic and/or other—such as location within system 100) of receipt as well as retrieving the classifications pre-assigned (in step 220 of FIG. 2) to the received email or other to-user targeted communication. In addition to retrieving the assigned communication classifications (e.g., 303, 305, 307 of FIG. 3), the process may now, if it has not done so before or within a predetermined length of recent time, start retrieving some non-behavioral categorization information about the User such as: current job or other title and position within organization hierarchy (e.g., CEO, CTO, CFO, VP, Group Manager, Tech Support Staff, Other Staff); current tasks/projects assigned to the User (e.g., High Level Management, Personnel Management, Management of Finances, Product Management, Customer Support, Bug Diagnose and Fix, etc.); normal work hours; normal work locations; average rate of use of enterprise collaborative communication tools; and so on. These background-wise collected pieces of additional information may be used to later associate the User with one or more clusters of other users (for example in block 470 of FIG. 4).

At step 522 it is determined if the received communication is automatically processed without the User's manual intervention, such as whether the received communication is automatically re-directed to a folder other than the User's main InBox due to an in-effect automated email/other handling policy, and if so, why was that action taken. More specifically, if the User's in-effect automated email/other handling policy includes a logic part indicating (for example), "IF Sender is S1, THEN move Email/other to Trash Folder". Of course this is a kind of information that is never relayed back to sender S1. However it is used to categorize the User as being associated with a recipient cluster that generally does not read communications sent by sender S1 and thus it might be worthwhile to never send that Email/other (e.g., 113) to this User in the first place. See for example, soft suggestion 261*a* I FIG. 2. Another in-effect automated email/other handling policy of the User might be, "IF Topic is T1 OR Length of Body >20 Words, THEN move Email/other to Trash Folder". In other words, the reason that the current User never reads this email may have nothing to do with who the sender (e.g., S1) is but rather because of some other classification assigned to the intercepted communication. Of course this kind of information is never relayed back to sender S1. However it is used to categorize the User as being associated with a recipient cluster that generally does not read communications directed to Topic T1 or having a length greater than 20 words.

At step 524 it is determined if an automated reply to the received Email/Other is automatically generated and sent back to Sender and/or CC'ed to others, and if yes, what the nature of the automated reply is. Generally in a case where an automated reply will be sent and/or topic related instructions will be automatically delegated to others to follows up on the sender's (e.g., S1) communication, it is determined that the targeted recipient (the current User) should not be deleted from the list of targeted recipients in step 240 of FIG. 2.

At step 526 it is determined if the current User has looked at least at the Envelope (e.g., Subject, From, CC headers) of the received Email/Other and if so, how long after receipt, or how long did the User look at what parts of the envelope? Thee pieces of information may be useful in categorizing the user as part of a cluster of users who quickly look at least at the envelope and give it more than cursory consideration (e.g., before deleting it) so that, if the communication is one of significant urgency but the User (targeted recipient) is one who routinely does not look at his/her emails until many hours after receipt, and then just trashes it anyway; perhaps the email should not be sent to the User in the first place. Repeated delay by the tracked User in looking at his emails moves him/her towards being categorized as belonging to a cluster of alike procrastinators for whom the system generally recommends not to send them time-urgent communications because the act is a waste of system resources.

At step 528 it is determined if the User looked inside the Envelope of received Email/Other and at its content and/or attachments. If yes, it is determined how long after receipt the User did so and what parts of internal content he/she looked at and for how long. This piece of tracking information allows the system to determine if the User likely belongs to a categorization cluster of users who routinely look inside their emails and actually study the contents.

At step 530 it is determined if the User has manually or automatically Forwarded the received email/other to further recipients and if yes, to determine how long after receipt the User did so, what parts were Forwarded, to whom (e.g., how many further recipients) and did User add to or otherwise edit original content within the received email/other. Inclusion within or affinity for this categorization cluster may be either a good thing or a bad one depending on context. If an urgent communication has to be forwarded to a select but limited group of further recipients and this User routinely does so, then perhaps this User should be deemed as one to be added on to the CC list for urgent communications because he/she does the right thing. On the other hand, if this User quickly and imprudently forwards non-urgent emails (e.g., jokes, gossip) to hundreds of social "friends" within the enterprise on a regular basis then perhaps this User should be deemed as one to be automatically (but anonymously) removed from the CC list for non-urgent communications because he/she consistently does something that is harmful to the enterprise.

At step 532 it is determined if the User has manually Replied to the received Email/Other and if yes, it is determined how long after receipt this occurred, the extent of the Reply and whether the User also CC'ed or BCC'ed to the original CC list of other recipients (if that list is not redacted by an anonymizing process) and/or if the User added further Recipients to CC or BCC list. If repeated, this type of tracked post-receipt activity can be indicative of the User belonging to or having an affinity to a categorization cluster of others who tend to be more involved when they receive the associated class of email/other.

A yet greater degree of post-receipt involvement may include the User performing post-receipt research related to the topic of the relevant email/other. For example, if the topic is enterprise software and the subtopic is a specifically reported software bug; then if the User checks out the corresponding source code from the enterprise repository, does some study of it and proposes a patch to fix the bug, such tracked post-receipt activity, if repeated, can be indicative of the User belonging to or having an affinity to a categorization cluster of others who tend to be even more involved when they receive the associated class of email/other. Step 534 represents a tracking of such involvement by automatically determining if the User has performed research on a topic of the received Email/Other, and if yes, determining how long after receipt this was done, the extent of the Research and whether the User Replied, CC'ed or BCC'ed his/her Research results to the original CC list and/or if User added further Recipients to CC or BCC list of the Reply.

The ellipses symbol ( . . . ) at 540 represents yet further cluster categorization tests similar to the ones described for steps 522-534. It is to be understood that steps 522-534 are merely examples. At step 545, the results of the post-receipt tracking determinations are used in combination with heuristically developed knowledge base rules (e.g., stored in module 155 of FIG. 1) to categorize the User's routine and/or non-routine post-receipt behaviors. The results are stored in an anonymizing database (152) which is one that does not reveal to unauthorized users, information that will lead to the identification of specific ones of the emails/others receiving users whose post-receipt behaviors have been tracked. In other words, their privacy is generally protected. The gathered information is used to heuristically develop post-receipt categorizing attributes (parameters like 370, 380 of FIG. 3) and to heuristically define corresponding clusters of alike behaving users.

In the example of FIG. 5, return paths 550 and 515 are thereafter taken so as to repeat the process (430') for others of received emails (or other forms of recipient-targeting communications) in step 510.

Referring again to FIG. 4, the user categorization results of process 430 need not be the only ones used for categorizing individual users or groups of users. Results from investigation blocks 410 and/or 420 may also be used. Block 450 may perform a knowledge base driven or other form of consolidation of the results. Block 470 associates each investigated user with corresponding categorization clusters of other users for different contextual situations (e.g., different classes of communications). The system may include adaptive learning algorithms that cause the communication classification attributes and the recipient categorizing attributes to converge on one another so that appropriate recommendations can be automatically made for various kinds of intercepted communications that are routinely carried out within the enterprise.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope be defined by the claims appended hereto.

What is claimed is:

1. A machine-implemented method comprising:
   automatically intercepting a launched recipients-targeting communication before it is received in recipient accessible storage areas of recipients targeted by the recipients-targeting communication;
   automatically first determining one or more classifications of the intercepted communication;
   automatically second determining one or more categorizations of one or more of targeted recipients of the intercepted communication, each of the determined categorizations being an anonymizing one whereby identity of specific ones of categorized recipients cannot be determined based merely on an indication of belonging to any one of the anonymizing categorizations;
   based on the first determined one or more classifications and on the second determined one or more anonymizing categorizations, third determining if the intercepted communication should be allowed to proceed as is for receipt in respective recipient accessible storage areas of the one or more anonymizing-wise categorized recipients; and
   in response to the third determining indicating that the intercepted communication should not be allowed to proceed as is to a respective one or more of recipient accessible storage areas of the anonymizing-wise categorized recipients, preventing the intercepted communication from proceeding as is to one or more respective recipient accessible storage areas of at least one of the anonymizing-wise categorized recipients.

2. The machine-implemented method of claim 1 wherein the intercepted communication is an email.

3. The machine-implemented method of claim 1 wherein:
   the automatic first determining of one or more classifications of the intercepted communication includes automatically analyzing a transmission envelope of the intercepted communication; and the automatic analyzing of the transmission envelope includes automatically analyzing at least one of a recipients identifying portion of the envelope, a sender identifying portion of the envelope, a subject matter identifying portion of the envelope, an urgency indicating portion of the envelope and a time stamp portion of the envelope.

4. The machine-implemented method of claim 1 wherein:
the automatic first determining of one or more classifications of the intercepted communication includes automatically analyzing a metadata portion of the intercepted communication; and the automatic analyzing of the metadata portion includes automatically analyzing at least one of a recipients identifying portion of the metadata, a sender identifying portion of the metadata, a subject matter identifying portion of the metadata, an urgency indicating portion of the metadata and a time stamp portion of the metadata.

5. The machine-implemented method of claim 1 wherein:
the automatic first determining of one or more classifications of the intercepted communication includes automatically analyzing a body content portion of the intercepted communication; and the automatic analyzing of the body content includes automatically analyzing the body content using natural language processing and automatically searching the body content for one or more predetermined key words, key symbols or catch phrases.

6. The machine-implemented method of claim 1 wherein:
the automatic second determining of one or more anonymizing categorizations of one or more of targeted recipients of the intercepted communication includes determining at least one of: whether one of the targeted recipients routinely does not access communications of a given classification even though it is received in a recipient accessible storage area of the targeted recipient; whether one of the targeted recipients routinely forwards communications of a given classification to further and relatively large numbers of other recipients to the detriment of an organization in which the intercepted communication is being used; whether one of the targeted recipients routinely forwards communications of a given classification to further other recipients who are not authorized to receive communications of that given classification; whether one of the targeted recipients routinely prefers not to receive the full content of a given classification but rather only the envelope or only the envelope and a generated executive summary of the full content.

7. The machine-implemented method of claim 1 wherein:
the third determining of whether the intercepted communication should be allowed to proceed as is for receipt in respective recipient accessible storage areas of the one or more anonymizing-wise categorized recipients includes:

automatically providing a sender of the intercepted communication with one or more recommendations indicating alternate options to allowing at least part of the intercepted communication to proceed for receipt in one or more of the respective recipient accessible storage areas; and complying with the sender's choice, where one of the alternate options recommended is that of allowing the intercepted communication to proceed as is.

8. The machine-implemented method of claim 1 wherein:
the third determining of whether the intercepted communication should be allowed to proceed as is for receipt in respective recipient accessible storage areas of the one or more categorized recipients includes:

not providing a sender of the intercepted communication with one or more recommendations indicating alternate options to allowing the intercepted communication to proceed as is for receipt in one or more of the respective recipient accessible storage areas; and the preventing of the intercepted communication from proceeding as is to one or more respective recipient accessible storage areas of at least one of the anonymizing-wise categorized recipients is carried out such that the sender is not directly aware of it.

9. The machine-implemented method of claim 1 and further comprising:

determining if the preventing of the intercepted communication from proceeding as is to one or more respective recipient accessible storage areas of at least one of the anonymizing-wise categorized recipients is such that the at least one of the anonymizing-wise categorized recipients is prevented from receiving an entirety of the intercepted communication; and in response to said determining that that the at least one of the anonymizing-wise categorized recipients is prevented from receiving an entirety of the intercepted communication, causing retrieval of the sent communication to be restricted such that identities of the targeted and anonymizing-wise categorized recipients are no longer discernable and thus determination of who was prevented from receiving the entirety of the intercepted communication is blocked.

10. A machine-implemented method for determining likely post-receipt behavior of a recipient or of a group of recipients of a recipients-targeting communication and for assigning the recipient or group of recipients to one or more anonymizing categories, the method comprising at least one of:

automatically determining if a respective recipient among said recipient or group of recipients has a current automated communications handling policy in effect for automatically handling communications of different classifications and using the currently in effect policy to first categorize the respective recipient with respect to likely post-receipt behavior of that respective recipient for recipients-targeting communications of the different classifications, wherein the first categorizing of the respective recipient is an anonymizing categorizing whereby specific identity of the so categorized respective recipient cannot be determined based merely on an indication of belonging to the first anonymizing categorization;

automatically surveying a respective recipient among said recipient or group of recipients with respect to that respective recipient's current likes, dislikes regarding, and preferences for handling recipients-targeting communications of the different classifications and based on the surveying, second categorizing the surveyed respective recipient, wherein the second categorizing of the surveyed respective recipient is an anonymizing categorizing whereby specific identity of the so categorized respective recipient cannot be determined based merely on an indication of belonging to the second anonymizing categorization; and automatically and repeatedly tracking a respective recipient's post-receipt behaviors with respect to recently received, recipients-targeting communications of the different classifications and third categorizing the tracked respective recipient according to his/her routine post-receipt behaviors for each of the different classifications of the recipients-targeting communications, wherein the third categorizing of the tracked respective recipient is an anonymizing categorizing whereby specific identity of the so categorized respective recipient cannot be determined based merely on an indication of belonging to the third anonymizing categorization.

11. The machine-implemented method of claim 10 wherein the automatic and repeated tracking of the respective recipient's post-receipt behaviors is carried out and includes:
  determining if the respective recipient routinely discards communications of a given classification without reading their body content.

12. The machine-implemented method of claim 10 wherein the automatic and repeated tracking of the respective recipient's post-receipt behaviors is carried out and includes:
  determining if the respective recipient routinely forwards communications of a given classification to further and relatively large numbers of other recipients to the detriment of an organization in which the intercepted communication is being used.

13. The machine-implemented method of claim 10 wherein the automatic and repeated tracking of the respective recipient's post-receipt behaviors is carried out and includes:
  determining if the respective recipient routinely forwards communications of a given classification to further other recipients who are not authorized to receive communications of that given classification.

14. The machine-implemented method of claim 10 wherein the automatic and repeated tracking of the respective recipient's post-receipt behaviors is carried out and includes:
  determining if the respective recipient routinely expresses a dislike to receiving entireties of recipients-targeting communications of a given classification and instead routinely indicates a preference for receiving just the transmission envelope of the communication without the body content or attachments or receiving just the transmission envelope of the communication plus a dynamically generated executive summary of the body content and attachments.

15. A data-handling machine system comprising:
  a plurality of first computers, the first computers allowing users to create or replicate data for communication on a recipient-targeting basis to one or more targeted recipients;
  one or more second computers, at least one of the second computers automatically intercepting all or a specified percentage of recipients-targeting communications launched within the data-handling machine system, the interceptions occurring before the launched communication are received in recipient accessible storage areas of recipients targeted by the recipients-targeting communications, wherein at least one of the second computers automatically determines one or more classifications for each of the intercepted communications; and
  one or more third computers, at least one of the third computers automatically determining one or more categorizations of one or more of targeted recipients of the intercepted communications, each of the determined categorizations being an anonymizing one whereby identity of specific ones of categorized recipients cannot be determined based merely on an indication of belonging to any one of the anonymizing categorizations;
  wherein at least one of the second computers automatically generates one or more anonymity preserving recommendations with respect to whether each intercepted communication should be allowed to proceed as is or not for receipt in respective recipient accessible storage areas of the one or more anonymizing-wise categorized recipients based on the determined one or more classifications and on the determined one or more categorizations, wherein the anonymity preserving recommendations preserve the anonymity of the anonymizing-wise categorized recipients;
  wherein at least one of the second computers automatically carries out at least one of forwarding, blocking and modifying of the intercepted communications based on one or more of the generated recommendations; and
  wherein the generated recommendations can include that of preventing a respective one of the intercepted communications from proceeding as is to one or more respective recipient accessible storage areas of at least one of the anonymizing-wise categorized recipients and instead blocking the respective one of the intercepted communications or modifying the respective one of the intercepted communications before it is allowed to proceed.

16. The machine system of claim 15 wherein:
  the plurality of first computers that allow users to create or replicate data for communication on a recipient-targeting basis include mobile wireless data processing and data transmitting devices.

17. The machine system of claim 15 wherein:
  the at least one of the second computers that automatically determines one or more classifications for each of the intercepted communications is configured to automatically determine whether an intercepted communication is primarily of a business related nature or primarily of a social communications nature.

18. The machine system of claim 15 wherein:
  the at least one of the second computers that automatically determines one or more classifications for each of the intercepted communications is configured to automatically determine whether an intercepted communication is primarily directed to executive administrative tasks of an enterprise or to management of technical resources of the enterprise.

19. The machine system of claim 15 wherein:
  the at least one of the second computers that automatically carries out at least one of said forwarding, blocking and modifying of the intercepted communication is configured to prevent retrieval of the identifies of targeted recipients of an intercepted communication if the intercepted communication is blocked or curtailed before being allowed to proceed as such to one or more of the targeted recipients.

* * * * *